United States Patent
Hlavinka et al.

(10) Patent No.: US 9,284,391 B2
(45) Date of Patent: Mar. 15, 2016

(54) POLYMER COMPOSITIONS HAVING IMPROVED BARRIER PROPERTIES

(75) Inventors: Mark L. Hlavinka, Bartlesville, OK (US); Qing Yang, Bartlesville, OK (US); Guylaine St. Jean, Bartlesville, OK (US); Brooke A. Gill, Glen Carbon, IL (US); Deloris R. Gagan, Ramona, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 89 days.

(21) Appl. No.: 13/306,321

(22) Filed: Nov. 29, 2011

(65) Prior Publication Data

US 2013/0059100 A1 Mar. 7, 2013

Related U.S. Application Data

(60) Provisional application No. 61/530,711, filed on Sep. 2, 2011.

(51) Int. Cl.
| | | |
|---|---|---|
| C08F 10/02 | (2006.01) | |
| C08F 110/02 | (2006.01) | |
| C08F 4/64 | (2006.01) | |
| C08F 4/659 | (2006.01) | |
| C08F 4/6592 | (2006.01) | |

(52) U.S. Cl.
CPC .............. *C08F 110/02* (2013.01); *C08F 10/02* (2013.01); *C08F 4/65912* (2013.01); *C08F 4/65916* (2013.01); *C08F 4/65925* (2013.01); *C08F 4/65927* (2013.01); *Y10T 428/1352* (2015.01)

(58) Field of Classification Search
CPC .... C08F 10/02; C08F 110/02; C08F 4/65916; C08F 4/65912; C08F 4/65925; C08F 4/65927
USPC ............... 526/113, 114, 118, 119, 348.1, 352
See application file for complete search history.

(56) References Cited

U.S. PATENT DOCUMENTS

| | | | |
|---|---|---|---|
| 3,248,179 | A | 4/1966 | Norwood |
| 4,060,480 | A | 11/1977 | Reed et al. |
| 4,402,864 | A | 9/1983 | McDaniel |
| 4,452,910 | A | 6/1984 | Hopkins et al. |
| 4,501,885 | A | 2/1985 | Sherk et al. |
| 4,588,790 | A | 5/1986 | Jenkins, III et al. |
| 4,877,763 | A | 10/1989 | McDaniel et al. |
| 5,352,749 | A | 10/1994 | DeChellis et al. |
| 5,376,611 | A | 12/1994 | Shveima |
| 5,436,304 | A | 7/1995 | Griffin et al. |
| 5,455,314 | A | 10/1995 | Burns et al. |
| 5,501,887 | A | 3/1996 | Tanaka et al. |
| 5,502,112 | A | 3/1996 | Peacock |
| 5,565,175 | A | 10/1996 | Hottovy et al. |
| 5,575,979 | A | 11/1996 | Hanson |
| 6,107,230 | A | 8/2000 | McDaniel et al. |
| 6,165,929 | A | 12/2000 | McDaniel et al. |
| 6,239,235 | B1 | 5/2001 | Hottovy et al. |
| 6,262,191 | B1 | 7/2001 | Hottovy et al. |
| 6,294,494 | B1 | 9/2001 | McDaniel et al. |
| 6,300,271 | B1 | 10/2001 | McDaniel et al. |
| 6,316,553 | B1 | 11/2001 | McDaniel et al. |
| 6,355,594 | B1 | 3/2002 | McDaniel et al. |
| 6,376,415 | B1 | 4/2002 | McDaniel et al. |
| 6,388,017 | B1 | 5/2002 | McDaniel et al. |
| 6,391,816 | B1 | 5/2002 | McDaniel et al. |
| 6,395,666 | B1 | 5/2002 | McDaniel et al. |
| 6,419,966 | B1 | 7/2002 | Davis |
| 6,432,496 | B1 | 8/2002 | Klosiewicz |
| 6,524,987 | B1 | 2/2003 | Collins et al. |
| 6,531,565 | B2 | 3/2003 | Kellum et al. |
| 6,548,441 | B1 | 4/2003 | McDaniel et al. |
| 6,548,442 | B1 | 4/2003 | McDaniel et al. |
| 6,576,583 | B1 | 6/2003 | McDaniel et al. |

(Continued)

FOREIGN PATENT DOCUMENTS

| | | |
|---|---|---|
| EP | 1138702 A1 | 10/2001 |
| WO | 9619527 A2 | 6/1996 |

(Continued)

OTHER PUBLICATIONS

ASTM F1249-13, Standard Test Method for Water Vapor Transmission Rate Through Plastic Film and Sheeting Using a Modulated Infrared Sensor; Nov. 2013.*

Dolan, Heather, "Nucleation of Polyethylene Blown Film," Sep. 2006, 14 pages.

Filing receipt and specification for provisional patent application entitled "Polymer Compositions Having Improved Barrier Properties," by Mark L. Hlavinka, et al., filed on Sep. 2, 2011 as U.S. Appl. No. 61/530,711.

Foreign communication from a related counterpart application—International Search Report and Written Opinion, PCT/US2012/035606, Nov. 8, 2012, 12 pages.

Foreign communication from a related counterpart application—International Preliminary Report on Patentability, PCT/US2012/053606, Mar. 4, 2014, 9 pages.

Foreign communication from a related counterpart application—International Search Report and Written Opinion, PCT/US2012/053608, Nov. 6, 2012, 8 pages.

Foreign communication from a related counterpart application—International Preliminary Report on Patentability, PCT/US2012/053608, Mar. 4, 2014, 6 pages.

Foreign communication from a related counterpart application—International Search Report and Written Opinion, PCT/US2012/053632, Nov. 28, 2012, 8 pages.

(Continued)

*Primary Examiner* — Roberto Rabago
(74) *Attorney, Agent, or Firm* — Conley Rose, P.C.; Rodney B. Carroll; Cheryl L. Huseman (57) ABSTRACT

A polymer having a melt index of from about 0.5 g/10 min to about 4.0 g/10 min and a density of equal to or greater than 0.96 g/cc which when formed into a 1-mil film displays a moisture vapor transmission rate ranging from equal to or greater than about 0 to equal to or about 20% greater than X where $X=k_1\{-61.95377+39.52785(M_z/M_w)-8.16974(M_z/M_w)^2+0.55114(M_z/M_w)^3\}+k_2\{-114.01555(\tau)+37.68575(M_z/M_w)(\tau)-2.89177(M_z/M_w)^2(\tau)\}+k_3\{120.37572(\tau)^2-25.91177(M_z/M_w)(\tau)^2\}+k_4\{18.03254(\tau)^3\}$ when $M_w$ is from about 100 kg/mol to about 180 kg/moL; $M_z$ is from about 300 kg/mol to about 1000 kg/mol; $\tau$ is from about 0.01 S to about 0.35 s; $k_1$ is 1 g/100 in²·day; $k_2$ is 1 g/100 in²·day·s; $k_3$ is 1 g/100 in²·day·s²; and $k_4$ is 1 g/100 in²·day·s³.

15 Claims, 2 Drawing Sheets

(56) References Cited

U.S. PATENT DOCUMENTS

| | | | |
|---|---|---|---|
| 6,583,241 | B1 | 6/2003 | Beach et al. |
| 6,613,712 | B1 | 9/2003 | McDaniel et al. |
| 6,623,866 | B2 | 9/2003 | Migliorini et al. |
| 6,632,894 | B1 | 10/2003 | McDaniel et al. |
| 6,667,274 | B1 | 12/2003 | Hawley et al. |
| 6,689,857 | B1 | 2/2004 | Larter et al. |
| 6,750,302 | B1 | 6/2004 | McDaniel et al. |
| 6,765,048 | B2 | 7/2004 | Dohrer et al. |
| 6,770,712 | B2 | 8/2004 | Golze et al. |
| 6,831,032 | B2 | 12/2004 | Spaether |
| 6,833,415 | B2 | 12/2004 | Kendrick et al. |
| 6,930,071 | B2 | 8/2005 | Knoeppel et al. |
| 6,969,740 | B2 | 11/2005 | Klosiewicz |
| 6,984,698 | B2 | 1/2006 | McLeod et al. |
| 6,998,441 | B2 | 2/2006 | Golze et al. |
| 7,064,225 | B2 | 6/2006 | Thorn et al. |
| 7,176,259 | B1 | 2/2007 | Klosiewicz |
| 7,226,886 | B2 | 6/2007 | Jayaratne et al. |
| 7,312,283 | B2 | 12/2007 | Martin et al. |
| 7,449,530 | B2 | 11/2008 | Hagerty et al. |
| 7,517,939 | B2 | 4/2009 | Yang et al. |
| 7,632,907 | B2 | 12/2009 | Sukhadia et al. |
| 7,737,220 | B2 | 6/2010 | Swabey et al. |
| 7,799,721 | B2 | 9/2010 | Yang et al. |
| 7,884,163 | B2 | 2/2011 | McDaniel et al. |
| 7,951,881 | B2 | 5/2011 | Sukhadia et al. |
| 7,956,139 | B2 | 6/2011 | Yang et al. |
| 7,960,487 | B2 | 6/2011 | Yang et al. |
| 8,067,518 | B2 | 11/2011 | Davey et al. |
| 8,076,421 | B2 | 12/2011 | Kapur et al. |
| 8,501,651 | B2 | 8/2013 | Ding et al. |
| 8,580,895 | B2 | 11/2013 | Standaert et al. |
| 2002/0020492 | A1 | 2/2002 | Nakamura et al. |
| 2003/0199657 | A1 | 10/2003 | Davis |
| 2005/0137342 | A1 | 6/2005 | Krishnaswamy et al. |
| 2006/0188678 | A1 | 8/2006 | Ohlsson et al. |
| 2009/0035545 | A1 | 2/2009 | Guenther et al. |
| 2009/0246491 | A1 | 10/2009 | Cortes |
| 2010/0035035 | A1 | 2/2010 | Defrang |
| 2010/0125114 | A1 | 5/2010 | Williams et al. |
| 2010/0210791 | A1 | 8/2010 | Bergstra et al. |
| 2010/0210797 | A1 | 8/2010 | Gray et al. |
| 2010/0221475 | A1 | 9/2010 | Sukhadia et al. |
| 2012/0058324 | A1 | 3/2012 | St. Jean et al. |
| 2013/0059103 | A1 | 3/2013 | Yang et al. |
| 2013/0059140 | A1 | 3/2013 | Hlavinka et al. |

FOREIGN PATENT DOCUMENTS

| | | | |
|---|---|---|---|
| WO | 0170827 | A1 | 9/2001 |
| WO | 0170828 | A1 | 9/2001 |
| WO | WO2004/002835 | | 1/2004 |
| WO | 2010098827 | A1 | 9/2010 |
| WO | 2011004032 | A1 | 1/2011 |
| WO | 2011133409 | A1 | 10/2011 |
| WO | 2012040147 | A1 | 3/2012 |
| WO | WO2012/040144 | | 3/2012 |
| WO | WO 2012/040144 | A1 * | 3/2012 |
| WO | 2013033689 | A1 | 3/2013 |
| WO | 2013033689 | A9 | 3/2013 |
| WO | 2013033690 | A1 | 3/2013 |
| WO | 2013033696 | A1 | 3/2013 |

OTHER PUBLICATIONS

Foreign communication from a related counterpart application—International Preliminary Report on Patentability, PCT/US2012/053632, Mar. 4, 2014, 6 pages.
McCormick, K., et al., "Polyethylene Coextruded Blown Film: Layer Arrangement and Gloss," undated, 18 pages.
NOVA Chemicals Product Data Sheet entitled "SCLAIR® polyethylene, Homopolymer HDPE Film Resin," Jul. 30, 2010, 2 pages, NOVA Brands Ltd.
Office Action dated Jan. 17, 2014 (4 pages), U.S. Appl. No. 13/224,775, filed Sep. 2, 2011.
Third-Party Submission Under 37 CFR 1.290 dated Jun. 19, 2013 (11 pages) for U.S. Appl. No. 13/224,775, filed Sep. 2, 2011.
Office Action dated May 23, 2013 (17 pages), U.S. Appl. No. 13/224,775, filed Sep. 2, 2011.
Office Action (Final) dated Aug. 6, 2013 (25 pages), U.S. Appl. No. 13/224,785, filed Sep. 2, 2011.
Advisory Action dated Oct. 9, 2013 (4 pages), U.S. Appl. No. 13/224,785, filed Sep. 2, 2011.
Office Action dated Apr. 29, 2014 (23 pages), U.S. Appl. No. 13/224,785, filed Sep. 2, 2011.
Peacock, Andrew, "Handbook of Polyethylene: Structures, Properties, and Applications," 2000, 1 page, Marcel Dekker, Inc.
Bird, R. Byron, et al., "Fluid Mechanics," Dynamics of Polymeric Liquids, vol. 1, Second Edition, 1987, cover page, publishing page, pp. xiii-xviii, and 171-172, John Wiley & Sons, Inc.
Chevron Phillips Chemical Company LP MSDS #240370 entitled "MarFlex® 9659 High Density Polyethylene," Jun. 2004, 1 page, MarFlex Polyethylene.
Chevron Phillips Chemical Company LLC brochure entitled "MarFlex® 9659 High Density Polyethylene," www.ides.com, Jun. 2005, 1 page, IDES Prospector, The Plastics Web®.
Cotton, F. Albert, et al., Advanced Inorganic Chemistry, Sixth Edition, cover page, title page, and pp. ix-x, Mar. 30, 1999, John Wiley & Sons, Inc.
Equistar Chemicals, LP brochure entitled Alathon® M6210 High Density Polyethylene, 2003, 1 page, Lyondell Chemical Company.
Hawley's Condensed Chemical Dictionary, Eleventh Edition, 1987, cover page, contents page, and pp. 862-863, Van Nostrand Reinhold Company, New York.
Hieber, C. A., et al., "Shear-rate-dependence modeling of polymer melt viscosity," Jul. 1992, pp. 931-938, vol. 32, No. 14, Polymer Engineering and Science.
Hieber, C. A., et al., "Some correlations involving the shear viscosity of polystyrene melts," 1989, pp. 321-332, vol. 28, No. 4, Rheologica Acta.
IDES Product Comparison, Generic HDPE, www.ides.com, Feb. 23, 2010, 5 pages, IDES Prospector, The Plastics Web®.
Patent application entitled "Polymer compositions having improved barrier properties," by Qing Yang, et al., filed Sep. 2, 2011 as U.S. Appl. No. 13/224,775.
Patent application entitled "Multilayer polymer films having improved barrier properties," by Mark L. Hlavinka, et al., filed Sep. 2, 2011 as U.S. Appl. No. 13/224,785.
Pinnavaia, Thomas J., "Intercalated clay catalysts," Apr. 22, 1983, vol. 220, No. 4595, pp. 365-371, Science.
Provisional patent application entitled "Polymer compositions having improved barrier properties," by Mark L. Hlavinka, et al., filed Sep. 2, 2011 as U.S. Appl. No. 61/530,711.
Thomas, J. M., "Sheet silicate intercalates: new agents for unusual chemical conversions," Intercalation Chemistry, 1982, Chapter 3, pp. 55-99, Academic Press, Inc.
Office Action (Final) dated Oct. 10, 2013 (6 pages), U.S. Appl. No. 13/224,775, filed Sep. 2, 2011.
Office Action (Final) dated Jul. 11, 2014 (11 pages), U.S. Appl. No. 13/224,775, filed Sep. 2, 2011.
Advisory Action dated Sep. 15, 2014 (2 pages), U.S. Appl. No. 13/224,775, filed Sep. 2, 2011.
Office Action (Final) dated Sep. 23, 2014 (30 pages), U.S. Appl. No. 13/224,785, filed Sep. 2, 2011.
Office Action dated Oct. 9, 2014 (6 pages), U.S. Appl. No. 13/224,775, filed Sep. 2, 2011.
Office Action dated Jan. 31, 2013, 30 pages, U.S. Appl. No. 13/224,785, filed Sep. 2, 2011.
International Search Report for Application No. PCT/US2012/053608 dated Nov. 6, 2012.
Examiner's Answer dated May 11, 2015 (9 pages), U.S. Appl. No. 13/224,785, filed Sep. 2, 2011.
Notice of Allowance dated Mar. 20, 2015 (15 pages), U.S. Appl. No. 13/224,775, filed Sep. 2, 2011.

* cited by examiner

POLYMER COMPOSITIONS HAVING IMPROVED BARRIER PROPERTIES

CROSS-REFERENCE TO RELATED APPLICATIONS

The present application claims priority to U.S. Provisional Patent Application Ser. No. 61/530,711 filed Sep. 2, 2011 by Hlavinka et al. and entitled "Polymer Compositions Having Improved Barrier Properties," which is incorporated herein by reference as if reproduced in its entirety.

TECHNICAL FIELD

The present disclosure relates to polymeric compositions, more specifically this disclosure relates to polyethylene (PE) compositions, and articles made from same.

BACKGROUND

Polyolefins are plastic materials useful for making a wide variety of valued products due to their combination of stiffness, ductility, barrier properties, temperature resistance, optical properties, availability, and low cost. One of the most valued products is plastic films. In particular, PE is the one of the largest volume polymers consumed in the world. It is a versatile polymer that offers high performance relative to other polymers and alternative materials such as glass, metal or paper. Plastic films such as PE films are mostly used in packaging applications but they also find utility in the agricultural, medical, and engineering fields.

PE films are manufactured in a variety of grades that are usually differentiated by the polymer density such that PE films can be designated for example, low density polyethylene (LDPE), linear low density polyethylene (LLDPE), medium density polyethylene (MDPE), and high density polyethylene (HDPE), wherein each density range has a unique combination of properties making it suitable for a particular application.

Despite the many positive attributes of PE, the film product remains permeable to gases such as oxygen or carbon dioxide and/or moisture (e.g., water). Thus, it would be desirable to develop a PE film product exhibiting improved barrier properties.

SUMMARY

Disclosed herein is a polymer having a melt index of from about 0.5 g/10 min to about 4.0 g/10 min and a density of equal to or greater than 0.96 g/cc which when formed into a 1-mil film displays a moisture vapor transmission rate ranging from equal to or greater than about 0 to equal to or about 20% greater than X where $X = k_1\{-61.95377 + 39.52785(M_z/M_w) - 8.16974(M_z/M_w)^2 + 0.55114(M_z/M_w)^3\} + k_2\{-114.01555(\tau) + 37.68575(M_z/M_w)(\tau) - 2.89177(M_z/M_w)^2(\tau)\} + k_3\{120.37572(\tau)^2 - 25.91177(M_z/M_w)(\tau)^2\} + k_4\{18.03254(\tau)^3\}$ when $M_w$ is from about 100 kg/mol to about 180 kg/moL; $M_z$ is from about 300 kg/mol to about 1000 kg/mol; $\tau$ is from about 0.01 S to about 0.35 s; $k_1$ is 1 g/100 in$^2$·day; $k_2$ is 1 g/100 in$^2$·day·s; $k_3$ is 1 g/100 in$^2$·day·s$^2$; and $k_4$ is 1 g/100 in$^2$·day·s$^3$.

DETAILED DESCRIPTION

Disclosed herein are polymers, polymeric compositions, polymeric articles, and methods of making same. The polymers and/or polymeric compositions of the present disclosure may comprise polyethylene. The polymers and/or polymeric compositions disclosed herein may comprise a blend of polymer components and result in a polymer and/or polymeric composition that unexpectedly displays improved barrier properties when compared to an otherwise similar polymeric composition prepared under different conditions. Hereinafter, the polymer refers both to the material collected as the product of a polymerization reaction and the polymeric composition comprising the polymer and one or more additives.

In an embodiment, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an embodiment, any arrangement and/or any combination of reactors may be employed to produce the polymer of the present disclosure.

According to one embodiment, the polymerization reactor system may comprise at least one loop slurry reactor. Such reactors are commonplace, and may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another embodiment, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

In an embodiment, a method of preparing a polymer comprises contacting an olefin and/or alpha-olefin monomer with a catalyst system under conditions suitable for the formation of a polymer of the type described herein. In an embodiment, a catalyst system for the production of a polymer of the type disclosed herein may comprise at least two metallocene compounds; an activator support, and an organoaluminum compound. Herein, the term "metallocene" describes a compound comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this disclosure comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like.

In an embodiment, the catalyst comprises a first metallocene compound hereinafter designated MTE-A. In an embodiment, MTE-A can be represented by the general formula:

MTE-A where $M^1$ is Ti, Zr, or Hf;
$X^1$ and $X^2$ are each independently F, Cl, Br, I, methyl, benzyl, phenyl, H, $BH_4$, a hydrocarbyloxide group having up to 20 carbon atoms, a hydrocarbylamino group having up to 20 carbon atoms, a trihydrocarbylsilyl group having up to 20 carbon atoms, $OBR'_2$ wherein R' may be an alkyl group having up to 12 carbon atoms or an aryl group having up to 12 carbon atoms, and $SO_3R''$, wherein R'' may be an alkyl group having up to 12 carbon atoms or an aryl group having up to 12 carbon atoms; and $Cp^1$ and $Cp^2$ are each independently a substituted or unsubstituted cyclopentadienyl group, or a substituted or unsubstituted indenyl group, where any substituent on $Cp^1$ and $Cp^2$ is H, a hydrocarbyl group having up to 18 carbon atoms or a hydrocarbylsilyl group having up to 18 carbon atoms.

In an embodiment, MTE-A is a dinuclear compound wherein each metal moiety has the same structural characteristic described previously herein. In an embodiment, MTE-A is a nonbridged metallocene. Nonlimiting examples of compounds suitable for use in this disclosure as MTE-A are represented by structures (1)-(13):

(1)

(2)

(3)

(4)

(5)

(6)

(7)

(8)
(9)
(10)
(11)
(12)
(13)

Other nonlimiting examples of metallocene compounds that may be suitably employed as MTE-A for preparation of a polymer of the type disclosed herein include bis(cyclopentadienyl)hafnium dichloride; bis(n-butylcyclopentadienyl) bis(di-t-butylamido)hafnium; bis(n-propylcyclopentadienyl) zirconium dichloride; bis(pentamethylcyclopentadienyl) zirconium dichloride; bis(1-propylindenyl)zirconium dichloride; or any combination thereof. In an embodiment, MTE-A comprises bis(indenyl)zirconium dichloride, alternatively MTE-A comprises the compound represented by structure (2). Hereinafter, the disclosure will refer predominately to the use of the compound represented by structure (5) as MTE-A, although other metallocenes of the types described herein are also contemplated for use in the teachings of this disclosure.

In an embodiment, the catalyst system comprises a second metallocene compound hereinafter designated MTE-B. In an embodiment, MTE-B is a bridged metallocene. In an embodiment, MTE-B can be represented by the general formula:

MTE-B where $M^2$ is Ti, Zr or Hf; $X^3$ and $X^4$ are independently F, Cl, Br, I, methyl, phenyl, benzyl, H, $BH_4$, a hydrocarbyloxide group having up to 20 carbon atoms, a hydrocarbylamino group having up to 20 carbon atoms, a trihydrocarbylsilyl group having up to 20 carbon atoms, $OBR'_2$ wherein R' may be an alkyl group having up to 12 carbon atoms or an aryl group having up to 12 carbon atoms, or $SO_3R''$ wherein R'' may be an alkyl group having up to 12 carbon atoms or an aryl group having up to 12 carbon atoms; $R^1$ and $R^2$ are independently hydrogen or a hydrocarbyl group having up to 18 carbon atoms; $Cp^3$ is a substituted or unsubstituted cyclopentadienyl group, a substituted or unsubstituted indenyl group, a substituted or unsubstituted fluorenyl group, where any substituent on $Cp^3$ is H, a hydrocarbyl group having up to 18 carbon atoms or a hydrocarbylsilyl group having up to 18 carbon atoms; and E represents a bridging group which may comprise (i) a cyclic or heterocyclic moiety having up to 18 carbon atoms, (ii) a group represented by the general formula $E^A R^{3A} R^{4A}$, wherein $E^A$ is C or Si, and $R^{3A}$ and $R^{4A}$ are independently H or a hydrocarbyl group having up to 18 carbon atoms, (iii) a group represented by the general formula $—CR^{3B}R^{4B}—CR^{3C}R^{4C}—$, wherein $R^{3B}$, $R^{4B}$, $R^{3C}$, and $R^{4C}$ are independently H or a hydrocarbyl group having up to 10 carbon atoms, (iv) a group represented by the general formula $—SiR^{3D}R^{4D}—SiR^{3E}R^{4E}—$, wherein $R^{3D}$, $R^{4D}$, $R^{3E}$, and $R^{4E}$ are independently H or a hydrocarbyl group having up to 10 carbon atoms, and wherein at least one of $R^{3A}$, $R^{3B}$, $R^{4A}$, $R^{4B}$, $R^{3C}$, $R^{4C}$, $R^{3D}$, $R^{4D}$, $R^{3E}$, $R^{4E}$, or the substituent on $Cp^3$ is (1) a terminal alkenyl group having up to 12 carbon atoms or (2) a dinuclear compound wherein each metal moiety has the same structural characteristic as MTE-B. Nonlimiting examples of compounds suitable for use in this disclosure as MTE-B are represented by structures (14)-(29):

(14)

(15)

(16)

(17)

(18)

(19)

(20)

(21)

(22)

(23)

-continued

(24)

(25)

(26)

(27)

(28)

(29)

In an embodiment, MTE-B is a compound represented by structure (16). In an embodiment MTE-B is further characterized as a catalyst which functions to produce a PE polymer having a higher number average molecular weight when compared to a PE polymer produced by MTE-A under otherwise similar conditions. In an embodiment MTE-A is further characterized as a catalyst which displays a positive hydrogen response when compared to MTE-B under otherwise similar conditions.

In an embodiment, the catalyst system comprises MTE-A which comprises the compound represented by structure (5) and MTE-B which comprises the compound represented by structure (16).

In one aspect, the activator-support comprises a chemically-treated solid oxide. Alternatively, the activator-support can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof.

Generally, chemically-treated solid oxides exhibit enhanced acidity as compared to the corresponding untreated solid oxide compound. The chemically-treated solid oxide also functions as a catalyst activator as compared to the corresponding untreated solid oxide. While the chemically-treated solid oxide activates the metallocene(s) in the absence of co-catalysts, it is not necessary to eliminate co-catalysts from the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron or organoborate compounds, ionizing ionic compounds, and the like.

The chemically-treated solid oxide can comprise a solid oxide treated with an electron-withdrawing anion. While not intending to be bound by the following statement, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

Chemically-treated solid oxides of this disclosure are formed generally from an inorganic solid oxide that exhibits Lewis acidic or Brønsted acidic behavior and has a relatively high porosity. The solid oxide is chemically-treated with an electron-withdrawing component, typically an electron-withdrawing anion, to form an activator-support.

According to one aspect of the present disclosure, the solid oxide used to prepare the chemically-treated solid oxide has a pore volume greater than about 0.1 cc/g. According to another aspect of the present disclosure, the solid oxide has a pore volume greater than about 0.5 cc/g. According to yet another aspect of the present disclosure, the solid oxide has a pore volume greater than about 1.0 cc/g.

In another aspect, the solid oxide has a surface area of from about 100 m$^2$/g to about 1000 m$^2$/g. In yet another aspect, the solid oxide has a surface area of from about 200 m$^2$/g to about 800 m$^2$/g. In still another aspect of the present disclosure, the solid oxide has a surface area of from about 250 m$^2$/g to about 600 m$^2$/g.

The chemically-treated solid oxide can comprise a solid inorganic oxide comprising oxygen and one or more elements selected from Group 2, 3, 4, 5, 6, 7, 8, 9, 10, 11, 12, 13, 14, or 15 of the periodic table, or comprising oxygen and one or more elements selected from the lanthanide or actinide elements (See: Hawley's Condensed Chemical Dictionary, 11th Ed., John Wiley & Sons, 1995; Cotton, F. A., Wilkinson, G., Murillo, C. A., and Bochmann, M., Advanced Inorganic Chemistry, 6th Ed., Wiley-Interscience, 1999). For example, the inorganic oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Suitable examples of solid oxide materials or compounds that can be used to form the chemically-treated solid oxide include, but are not limited to, $Al_2O_3$, $B_2O_3$, BeO, $Bi_2O_3$, CdO, $CO_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. For example, the solid oxide can comprise silica, alumina, silica-alumina, silica-coated alumina, aluminum phosphate, aluminophosphate, heteropolytungstate, titania, zirconia, magnesia, boria, zinc oxide, mixed oxides thereof, or any combination thereof.

The solid oxide of this disclosure encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound. Examples of mixed oxides that can be used in the activator-support of the present disclosure include, but are not limited to, silica-alumina, silica-titania, silica-zirconia, zeolites, various clay minerals, alumina-titania, alumina-zirconia, zinc-aluminate, alumina-boria, silica-boria, aluminophosphate-silica, titania-zirconia, and the like. The solid oxide of this disclosure also encompasses oxide materials such as silica-coated alumina, as described in U.S. Pat. No. 7,884,163, the disclosure of which is incorporated herein by reference in its entirety.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect of the present disclosure, the electron-withdrawing component is an electron-withdrawing anion derived from a salt, an acid, or other compound, such as a volatile organic compound, that serves as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phosphotungstate, and the like, including mixtures and combinations thereof. In addition, other ionic or non-ionic compounds that serve as sources for these electron-withdrawing anions also can be employed in the present disclosure. It is contemplated that the electron-withdrawing anion can be, or can comprise, fluoride, chloride, bromide, phosphate, triflate, bisulfate, or sulfate, and the like, or any combination thereof, in some aspects of this disclosure. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or any combination thereof.

Thus, for example, the activator-support (e.g., chemically-treated solid oxide) used in the catalyst compositions can be, or can comprise, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In one aspect, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, and the like, or any combination thereof. In another aspect, the activator-support comprises fluorided alumina; alternatively, comprises chlorided alumina; alternatively, comprises sulfated alumina; alternatively, comprises fluorided silica-alumina; alternatively, comprises sulfated silica-alumina; alternatively, comprises fluorided silica-zirconia; alternatively, comprises chlorided silica-zirconia; or alternatively, comprises fluorided silica-coated alumina.

When the electron-withdrawing component comprises a salt of an electron-withdrawing anion, the counterion or cation of that salt can be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the activator-support to the desired level. Combinations of electron-withdrawing components can be contacted with the oxide material simultaneously or individually, and in any order that affords the desired chemically-treated solid oxide acidity. For example, one aspect of this disclosure is employing two or more electron-withdrawing anion source compounds in two or more separate contacting steps.

Thus, one example of such a process by which a chemically-treated solid oxide is prepared is as follows: a selected solid oxide, or combination of solid oxides, is contacted with a first electron-withdrawing anion source compound to form a first mixture; this first mixture is calcined and then contacted with a second electron-withdrawing anion source compound to form a second mixture; the second mixture is then calcined to form a treated solid oxide. In such a process, the first and second electron-withdrawing anion source compounds can be either the same or different compounds.

According to another aspect of the present disclosure, the chemically-treated solid oxide comprises a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. Nonlimiting examples of the metal or metal ion include zinc, nickel, vanadium, titanium, silver, copper, gallium, tin, tungsten, molybdenum, zirconium, and the like, or combinations thereof. Examples of chemically-treated solid oxides that contain a metal or metal ion include, but are not limited to, chlorided zinc-impregnated alumina, fluorided titanium-impregnated alumina, fluorided zinc-impregnated alumina, chlorided zinc-impregnated silica-alumina, fluorided zinc-impregnated silica-alumina, sulfated zinc-impregnated alumina, chlorided zinc aluminate, fluorided zinc aluminate, sulfated zinc aluminate, silica-coated alumina treated with hexafluorotitanic acid, silica-coated alumina treated with zinc and then fluorided, and the like, or any combination thereof.

Any method of impregnating the solid oxide material with a metal can be used. The method by which the oxide is contacted with a metal source, typically a salt or metal-containing compound, can include, but is not limited to, gelling, co-gelling, impregnation of one compound onto another, and the like. If desired, the metal-containing compound is added to or impregnated into the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, and the like, or combinations of these metals. For example, zinc is often used to impregnate the solid oxide because it can provide improved catalyst activity at a low cost.

The solid oxide can be treated with metal salts or metal-containing compounds before, after, or at the same time that the solid oxide is treated with the electron-withdrawing anion. Following any contacting method, the contacted mixture of solid compound, electron-withdrawing anion, and the metal ion is typically calcined. Alternatively, a solid oxide material, an electron-withdrawing anion source, and the metal salt or metal-containing compound are contacted and calcined simultaneously.

Various processes are used to form the chemically-treated solid oxide useful in the present disclosure. The chemically-treated solid oxide can comprise the contact product of one or more solid oxides with one or more electron-withdrawing anion sources. It is not required that the solid oxide be calcined prior to contacting the electron-withdrawing anion source. The contact product typically is calcined either during or after the solid oxide is contacted with the electron-withdrawing anion source. The solid oxide can be calcined or uncalcined. Various processes to prepare solid oxide activator-supports that can be employed in this disclosure have been reported. For example, such methods are described in U.S. Pat. Nos. 6,107,230; 6,165,929; 6,294,494; 6,300,271; 6,316,553; 6,355,594; 6,376,415; 6,388,017; 6,391,816; 6,395,666; 6,524,987; 6,548,441; 6,548,442; 6,576,583; 6,613,712; 6,632,894; 6,667,274; and 6,750,302; the disclosures of which are incorporated herein by reference in their entirety.

According to one aspect of the present disclosure, the solid oxide material is chemically-treated by contacting it with an electron-withdrawing component, typically an electron-withdrawing anion source. Further, the solid oxide material optionally is chemically treated with a metal ion, and then calcined to form a metal-containing or metal-impregnated chemically-treated solid oxide. According to another aspect of the present disclosure, the solid oxide material and electron-withdrawing anion source are contacted and calcined simultaneously.

The method by which the oxide is contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide, electron-withdrawing anion, and optional metal ion, is calcined.

The solid oxide activator-support (i.e., chemically-treated solid oxide) thus can be produced by a process comprising:

1) contacting a solid oxide (or solid oxides) with an electron-withdrawing anion source compound (or compounds) to form a first mixture; and 2) calcining the first mixture to form the solid oxide activator-support.

According to another aspect of the present disclosure, the solid oxide activator-support (chemically-treated solid oxide) is produced by a process comprising:

1) contacting a solid oxide (or solid oxides) with a first electron-withdrawing anion source compound to form a first mixture;

2) calcining the first mixture to produce a calcined first mixture;

3) contacting the calcined first mixture with a second electron-withdrawing anion source compound to form a second mixture; and 4) calcining the second mixture to form the solid oxide activator-support.

According to yet another aspect of the present disclosure, the chemically-treated solid oxide is produced or formed by contacting the solid oxide with the electron-withdrawing anion source compound, where the solid oxide compound is calcined before, during, or after contacting the electron-withdrawing anion source, and where there is a substantial absence of aluminoxanes, organoboron or organoborate compounds, and ionizing ionic compounds.

Calcining of the treated solid oxide generally is conducted in an ambient atmosphere, typically in a dry ambient atmosphere, at a temperature from about 200° C. to about 900° C., and for a time of about 1 minute to about 100 hours. Calcining can be conducted at a temperature of from about 300° C. to about 800° C., or alternatively, at a temperature of from about 400° C. to about 700° C. Calcining can be conducted for about 30 minutes to about 50 hours, or for about 1 hour to about 15 hours. Thus, for example, calcining can be carried out for about 1 to about 10 hours at a temperature of from about 350° C. to about 550° C. Any suitable ambient atmosphere can be employed during calcining Generally, calcining is conducted in an oxidizing atmosphere, such as air. Alternatively, an inert atmosphere, such as nitrogen or argon, or a reducing atmosphere, such as hydrogen or carbon monoxide, can be used.

According to one aspect of the present disclosure, the solid oxide material is treated with a source of halide ion, sulfate ion, or a combination of anions, optionally treated with a metal ion, and then calcined to provide the chemically-treated solid oxide in the form of a particulate solid. For example, the solid oxide material can be treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator. Useful acidic activator-supports include, but are not limited to, bromided alumina, chlorided alumina, fluorided alumina, sulfated alumina, bromided silica-alumina, chlorided silica-alumina, fluorided silica-alumina, sulfated silica-alumina, bromided silica-zirconia, chlorided silica-zirconia, fluorided silica-zirconia, sulfated silica-zirconia, fluorided silica-titania, alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, a pillared clay, such as a pillared montmorillonite, optionally treated with fluoride, chloride, or sulfate; phosphated alumina or other aluminophosphates optionally treated with sulfate, fluoride, or chloride; or any combination of the above. Further, any of these activator-supports optionally can be treated with a metal ion.

The chemically-treated solid oxide can comprise a fluorided solid oxide in the form of a particulate solid. The fluorided solid oxide can be formed by contacting a solid oxide with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), $AlF_3$, $NH_4AlF_4$, analogs thereof, and combinations thereof. Triflic acid and ammonium triflate also can be employed. For example, ammonium bifluoride ($NH_4HF_2$) can be used as the fluoriding agent, due to its ease of use and availability.

If desired, the solid oxide is treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this aspect of the disclosure include, but are not limited to, freons, perfluorohexane, perfluorobenzene, fluoromethane, trifluoroethanol, and the like, and combinations thereof. Calcining temperatures generally must be high enough to decompose the compound and release fluoride. Gaseous hydrogen fluoride (HF) or fluorine ($F_2$) itself also can be used with the solid oxide if fluorided while calcining. Silicon tetrafluoride ($SiF_4$) and compounds containing tetrafluoroborate ($BF_4^-$) also can be employed. One convenient method of contacting the solid oxide with the fluoriding agent is to vaporize a fluoriding agent into a gas stream used to fluidize the solid oxide during calcination.

Similarly, in another aspect of this disclosure, the chemically-treated solid oxide comprises a chlorided solid oxide in the form of a particulate solid. The chlorided solid oxide is formed by contacting a solid oxide with a chloriding agent. The chloride ion can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used, such as $SiCl_4$, $SiMe_2Cl_2$, $TiCl_4$, $BCl_3$, and the like, including mixtures thereof. Volatile organic chloriding agents can be used. Examples of suitable volatile organic chloriding agents include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting the oxide with the chloriding agent is to vaporize a chloriding agent into a gas stream used to fluidize the solid oxide during calcination.

The amount of fluoride or chloride ion present before calcining the solid oxide generally is from about 1 to about 50% by weight, where the weight percent is based on the weight of the solid oxide, for example, silica-alumina, before calcining. According to another aspect of this disclosure, the amount of fluoride or chloride ion present before calcining the solid oxide is from about 1 to about 25% by weight, and according to another aspect of this disclosure, from about 2 to about 20% by weight. According to yet another aspect of this disclosure, the amount of fluoride or chloride ion present before calcining the solid oxide is from about 4 to about 10% by weight. Once impregnated with halide, the halided oxide can be dried by any suitable method including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina typically has a pore volume greater than about 0.5 cc/g. According to one aspect of the present disclosure, the pore volume is greater than about 0.8 cc/g, and according to another aspect of the present disclosure, greater than about 1.0 cc/g. Further, the silica-alumina generally has a surface area greater than about 100 $m^2/g$. According to another aspect of this disclosure, the surface area is greater than about 250 $m^2/g$. Yet, in another aspect, the surface area is greater than about 350 $m^2/g$.

The silica-alumina utilized in the present disclosure typically has an alumina content from about 5 to about 95% by weight. According to one aspect of this disclosure, the alumina content of the silica-alumina is from about 5 to about 50%, or from about 8% to about 30%, alumina by weight. In another aspect, high alumina content silica-alumina compounds can employed, in which the alumina content of these silica-alumina compounds typically ranges from about 60% to about 90%, or from about 65% to about 80%, alumina by weight. According to yet another aspect of this disclosure, the solid oxide component comprises alumina without silica, and according to another aspect of this disclosure, the solid oxide component comprises silica without alumina.

The sulfated solid oxide comprises sulfate and a solid oxide component, such as alumina or silica-alumina, in the form of a particulate solid. Optionally, the sulfated oxide is treated further with a metal ion such that the calcined sulfated oxide comprises a metal. According to one aspect of the present disclosure, the sulfated solid oxide comprises sulfate and alumina. In some instances, the sulfated alumina is formed by a process wherein the alumina is treated with a sulfate source, for example, sulfuric acid or a sulfate salt such as ammonium sulfate. This process is generally performed by forming a slurry of the alumina in a suitable solvent, such as alcohol or water, in which the desired concentration of the sulfating agent has been added. Suitable organic solvents include, but are not limited to, the one to three carbon alcohols because of their volatility and low surface tension.

According to one aspect of this disclosure, the amount of sulfate ion present before calcining is from about 0.5 to about 100 parts by weight sulfate ion to about 100 parts by weight solid oxide. According to another aspect of this disclosure, the amount of sulfate ion present before calcining is from about 1 to about 50 parts by weight sulfate ion to about 100 parts by weight solid oxide, and according to still another aspect of this disclosure, from about 5 to about 30 parts by weight sulfate ion to about 100 parts by weight solid oxide. These weight ratios are based on the weight of the solid oxide before calcining. Once impregnated with sulfate, the sulfated oxide can be dried by any suitable method including, but not limited to, suction filtration followed by evaporation, drying under vacuum, spray drying, and the like, although it is also possible to initiate the calcining step immediately.

According to another aspect of the present disclosure, the activator-support used in preparing the catalyst compositions of this disclosure comprises an ion-exchangeable activator-support, including but not limited to silicate and aluminosilicate compounds or minerals, either with layered or non-layered structures, and combinations thereof. In another aspect of this disclosure, ion-exchangeable, layered aluminosilicates such as pillared clays are used as activator-supports. When the acidic activator-support comprises an ion-exchangeable activator-support, it can optionally be treated with at least one electron-withdrawing anion such as those disclosed herein, though typically the ion-exchangeable activator-support is not treated with an electron-withdrawing anion.

According to another aspect of the present disclosure, the activator-support of this disclosure comprises clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the metallocene component.

According to another aspect of the present disclosure, the clay materials of this disclosure encompass materials either in their natural state or that have been treated with various ions by wetting, ion exchange, or pillaring. Typically, the clay material activator-support of this disclosure comprises clays that have been ion exchanged with large cations, including polynuclear, highly charged metal complex cations. However, the clay material activator-supports of this disclosure also encompass clays that have been ion exchanged with simple salts, including, but not limited to, salts of Al(III), Fe(II), Fe(III), and Zn(II) with ligands such as halide, acetate, sulfate, nitrate, or nitrite.

According to another aspect of the present disclosure, the activator-support comprises a pillared clay. The term "pillared clay" is used to refer to clay materials that have been ion exchanged with large, typically polynuclear, highly charged metal complex cations. Examples of such ions include, but are not limited to, Keggin ions which can have charges such as $7^+$, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in: T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. Nos. 4,452,910; 5,376,611; and 4,060,480; the disclosures of which are incorporated herein by reference in their entirety.

The pillaring process utilizes clay minerals having exchangeable cations and layers capable of expanding. Any pillared clay that can enhance the polymerization of olefins in the catalyst composition of the present disclosure can be used. Therefore, suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof. In one aspect, the pillared clay activator-support comprises bentonite or montmorillonite. The principal component of bentonite is montmorillonite.

The pillared clay can be pretreated if desired. For example, a pillared bentonite is pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this disclosure.

The activator-support used to prepare the catalyst compositions of the present disclosure can be combined with other inorganic support materials, including, but not limited to, zeolites, inorganic oxides, phosphated inorganic oxides, and the like. In one aspect, typical support materials that are used include, but are not limited to, silica, silica-alumina, alumina, titania, zirconia, magnesia, boria, thoria, aluminophosphate, aluminum phosphate, silica-titania, coprecipitated silica/titania, mixtures thereof, or any combination thereof.

The process of making these activator-supports may include precipitation, co-precipitation, impregnation, gelation, pore-gelation, calcining (at up to 900° C.), spray-drying, flash-drying, rotary drying and calcining, milling, sieving, and similar operations.

In an embodiment, an organoaluminum compound suitable for use in the present disclosure comprises an alkylaluminum compound. For example, the organoaluminum compound may comprise a trialkylaluminum compound, having the general formula $AlR_3$. Nonlimiting examples of trialkylaluminum compounds suitable for use in this disclosure include triisobutylaluminum (TiBA or TiBAl); tri-n-butylaluminum (TNBA); tri-octly-butylaluminum (TOBA); triethylaluminum (TEA); and/or other appropriate alkyl-aluminum complexes, and combinations thereof. Additionally, partially hydrolyzed alkylaluminum compounds and/or aluminoxanes, may be used. In an embodiment, the organoaluminum compound comprises a compound represented by the general formula:

where $X^5$ is a halide, hydrocarbyloxide group, hydrocarbylamino group or combinations thereof; $X^6$ is a hydrocarbyl group having up to 18 carbon atom; p ranges from 0 to 2; and q is 3−p.

In an embodiment, a process for the preparation of a polymer of the type disclosed herein comprises polymerization of an olefin monomer in the presence of a catalyst system comprising at least two metallocene complexes. In such embodiments, the first and second metallocene complexes are of the type described herein (i.e., MTE-A and MTE-B) and results in the formation of the two components of the polymer when both catalysts are employed in a single reactor.

In an embodiment, a monomer (e.g., ethylene) is polymerized using the methodologies disclosed herein to produce a polymer of the type disclosed herein. The polymer may comprise a homopolymer. In an embodiment, the polymer is a homopolymer. It is to be understood that an inconsequential amount of comonomer may be present in the polymers disclosed herein and the polymer still be considered a homopolymer. Herein, an inconsequential amount of a comonomer refers to an amount that does not substantively affect the properties of the polymer disclosed herein. For example a comonomer can be present in an amount of less than about 0.5 wt. %, 0.1 wt. %, or 0.01 wt. % based on the total weight of polymer.

The polymer may include other additives. Examples of additives include, but are not limited to, antistatic agents, colorants, stabilizers, nucleators, surface modifiers, pigments, slip agents, antiblocks, tackafiers, polymer processing aids, and combinations thereof. Such additives may be used singularly or in combination and may be included in the polymer before, during, or after preparation of the polymer as described herein. Such additives may be added via any suitable technique, for example during an extrusion or compounding step such as during pelletization or subsequent processing into an end use article.

In an embodiment, a polymer of the type described herein is characterized by a density of equal to or greater than about 0.960 g/cc, alternatively greater than about 0.9615 g/cc, or alternatively greater than about 0.9625 g/cc as determined in accordance with ASTM D 1505.

A polymer of the type described herein may be a multimodal resin. Herein, the "modality" of a polymer resin refers to the form of its molecular weight distribution curve, i.e., the appearance of the graph of the polymer weight fraction as a function of its molecular weight, as may be displayed by, for example, gel permeation chromatography (GPC). The polymer weight fraction refers to the weight fraction of molecules of a given size. A polymer having a molecular weight distribution curve showing a single peak may be referred to as a unimodal polymer, a polymer having a curve showing two distinct peaks may be referred to as bimodal or a bimodal-like polymer, a polymer having a curve showing three distinct peaks may be referred to as trimodal polymer, etc. Polymers having molecular weight distribution curves showing more than one peak may be collectively referred to as multimodal polymers or resins. It is acknowledged that, in some instances, a multimodal polymer may appear to have a single peak via, for example, GPC analysis, when in fact the polymer itself is multimodal. In such instances, overlap of peaks may obscure the presence of other peaks and may imply unimodality, when in fact multimodality is a more accurate representation of the nature of the polymer or polymers.

In an embodiment, the polymer is characterized as a bimodal resin. Such a bimodal resin may show two distinct peaks attributable to a higher molecular weight (HMW) component and a lower molecular weight (LMW) component. In an embodiment the LMW component is present in the polymer composition in an amount of from about 60% to about 90%, alternatively from about 65% to about 90%, or alternatively from about 70% to about 88%. In an embodiment, the HMW component is present in the polymer in an amount of from about 10% to about 40%, alternatively from about 10% to about 35% or alternatively from about 12% to about 30%.

In an embodiment, a polymer of the type described herein has a weight average molecular weight ($M_w$) of from about 100 kg/mol to about 180 kg/mol; alternatively of from about 110 kg/mol to about 170 kg/mol; or alternatively of from about 120 kg/mol to about 160 kg/mol. The weight average molecular weight describes the molecular weight distribution of a polymer and is calculated according to equation 1:

$$M_w = \frac{\sum_i N_i M_i^2}{\sum_i N_i M_i} \quad (1)$$

where $N_i$ is the number of molecules at molecular weight $M_i$.

A polymer of the type described herein may be characterized by molecular weight distribution (MWD) of from about 6 to about 20, alternatively from about 7 to about 18, or alternatively from about 7.5 to about 16. The MWD is the ratio of the $M_w$ to the number average molecular weight ($M_n$), which is also referred to as the polydispersity index (PDI) or more simply as polydispersity. The number average molecular weight is the common average of the molecular weights of the individual polymers and may be calculated according to equation (2):

$$M_n = \frac{\sum_i N_i M_i}{\sum_i N_i} \quad (2)$$

where $N_i$ is the number of molecules at molecular weight $M_i$.

A polymer of the type described herein may be further characterized by a ratio of z-average molecular weight ($M_z$) to $M_w$ ($M_z/M_w$) of from about 3 to about 7, alternatively from about 3.5 to about 6.5, or alternatively from about 4.5 to about 6. The z-average molecular weight is a higher order molecular weight average which is calculated according to equation (3):

$$M_z = \Sigma_i N_i M_i^3 / \Sigma_i N_i M_i^2 \quad (3)$$

where $N_i$ is the number of molecules at molecular weight $M_i$. The ratio of $M_z/M_w$ is another indication of the breadth of the MWD of a polymer. In an embodiment, a polymer of the type described herein has an $M_z$ of from about 300 kg/mol to about 1000 kg/mol; alternatively of from about 500 kg/mol to about 900 kg/mol; or alternatively of from about 600 kg/mol to about 850 kg/mol.

In an embodiment, a polymer of the type described herein has a melt index, MI, in the range of from about 0.5 grams per 10 minutes (g/10 min) to about 4.0 g/10 min, alternatively from about 0.5 g/10 min to about 3.0 g/10 min, or alternatively from about 0.75 g/10 min to about 2.5 g/10 min. The melt index (MI) refers to the amount of a polymer which can be forced through a melt indexer orifice of 0.0825 inch diameter when subjected to a force of 2160 grams in ten minutes at 190° C., as determined in accordance with ASTM D 1238.

In an embodiment, a polymer of the type described herein has a zero shear viscosity ($E_o$), in the range of from about 8000 Pa·s to about 50000 Pa·s, alternatively from about 10000 Pa·s to about 45000 Pa·s, or alternatively of from about 15000 Pa·s to about 40000 Pa·s as determined in accordance with Carreau-Yasuda (CY) model, which is represented by equation (4):

$$E = E_o[1 + (T_\xi \dot{\gamma})^a]^{\frac{n-1}{a}} \quad (4)$$

where
E=viscosity (Pa·s)
$\dot{\gamma}$=shear rate (1/s)
a=rheological breadth parameter
$T_\xi$=relaxation time (s) [describes the location in time of the transition region]
$E_o$=zero shear viscosity (Pa·s) [defines the Newtonian plateau]
n=power law constant [defines the final slope of the high shear rate region].

To facilitate model fitting, the power law constant n is held at a constant value. Details of the significance and interpretation of the CY model and derived parameters may be found in: C. A. Hieber and H. H. Chiang, Rheol. Acta, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids*, Volume 1, Fluid Mechanics, 2nd Edition, John Wiley & Sons (1987), each of which is incorporated by reference herein in its entirety.

The zero shear viscosity refers to the viscosity of the polymeric composition at a zero shear rate and is indicative of the materials molecular structure. Further, for polymer melts, the zero shear viscosity is often a useful indicator of processing attributes such as melt strength in blow-molding and foam technologies and bubble stability in film blowing. For example, the higher the zero shear viscosity, the better the melt strength or bubble stability.

In an embodiment, a polymer of the type described herein has a CY-a value as defined by Equation (4) of greater than about 0.2, alternatively greater than about 0.26, or alternatively greater than about 0.30.

In an embodiment, a polymer of the type described herein has a rheological relaxation time ($\tau$), defined by Equation (4), in the range of from about 0.01 s to about 0.35 s, alternatively, from about 0.03 s to about 0.35 s, or alternatively, from about 0.05 s to about 0.35 s. The relaxation rate refers to the viscous relaxation times of the polymer and is indicative of a distribution of relaxation times associated with the wide distribution of molecular weights.

Polymers of the type disclosed herein may be formed into articles of manufacture or end-use articles using techniques known in the art such as extrusion, blow molding, injection molding, fiber spinning, thermoforming, and casting.

In an embodiment the polymers disclosed herein are formed into a film using any suitable technology for preparation of a film. For example, the film may be produced by a coextrusion cast film process wherein molten polymers of the type disclosed herein are coextruded through a slot or die to form a thin extruded sheet. The sheet or film is extruded onto a water cooled chill roll. The chill roll functions to immediately quench the sheet or film from its molten state to a solid state.

In an embodiment the sheet or film may then be passed through rollers designed to stretch the sheet in differing axial directions to produce biaxially oriented films, which may be further trimmed and rolled for transport or storage.

In an embodiment polymers of the type disclosed herein are formed into a film via a blown film process. In a blown film process, plastic melt is extruded through an annular die, usually vertically, to form a walled tube. The size of the tube is a function of the blow-up ratio that is controlled by the amount of air introduced at the die. The bubble then moves upwards until it passes through nip rolls where the tube is flattened. This flattened tube is then collected in rolled form. In some cases the edges of the tube are slit forming two flat sheets which are then collected in roll form. Cooling of the blown film tube is accomplished through the use of an air ring which sits on top of the die and blows cool air against the outside surface of the tube. On higher output lines, fresh cooled air may be continuously circulated inside the bubble, allowing for greater output rates. This manner of cooling the bubble is known as Internal Bubble Cooling (IBC). Typically, the blow-up ratio between die and blown bubble would be 1.5 to 4 times the die diameter. The drawdown between the melt wall thickness and the cooled film thickness occurs in both radial and longitudinal directions and is easily controlled by changing the volume of air inside the bubble and by altering the take off speed of the line.

The film formed from polymer resins of this disclosure may be of any thickness desired by the user. For example, the film may have a thickness ranging from about 0.75 mils to about 3 mils; alternatively from about 1 mil to about 2.5 mils; or alternatively from about 1.5 mils to about 2.0 mils.

In an embodiment, films formed from polymers of this disclosure may display enhanced barrier properties. For example said films may display a reduced moisture vapor transmission rates (MVTR).

In an embodiment, polymers of the type disclosed herein having a density of from 0.960 g/cc to about 0.967 g/cc are formed into 1-mil thick films via a blown film process. Conventional polymers having densities in the range of 0.960 g/cc to about 0.967 g/cc may display a moisture vapor transmission rate of X where $X=k_1\{-61.95377+39.52785(M_z/M_w)-8.16974(M_z/M_w)^2+0.55114(M_z/M_w)^3\}+k_2\{-114.01555(\tau)+37.68575(M_z/M_w)(\tau)-2.89177(M_z/M_w)^2(\tau)\}+k_3\{120.37572(\tau)^2-25.91177(M_z/M_w)(\tau)^2\}+k_4\{18.03254(\tau)^3\}$ when $M_w$ is from about 100 kg/mol to about 180 kg/moL; $M_z$ is from about 300 kg/mol to about 1000 kg/mol; $\tau$ is from about 0.01 S to about 0.35 s. The constants $k_1$, $k_2$, $k_3$, and $k_4$ are defined as follows: $k_1$ is 1 g/100 in²·day; $k_2$ is 1 g/100 in²·day·s; $k_3$ is 1 g/100 in²·day·s²; and $k_4$ is 1 g/100 in²·day·s³. Polymers of the type disclosed herein having a density of from 0.960 g/cc to about 0.967 g/cc when formed into 1-mil thick films via a blown film process display MVTR values ranging from about 0 to 20% greater than X. In an embodiment films formed from polymers of the type disclosed herein may display an MVTR of equal to or less than about 0.55 grams-mil per 100 square inch per day (g-mil/100 in²/day), alternatively equal to or less than about 0.50 g-mil/100 in²/day, or alternatively equal to or less than about 0.46 g-mil/100 in²/day as measured in accordance with ASTM F 1249. The MVTR measures passage of gaseous $H_2O$ through a barrier. The MVTR may also be referred to as the water vapor transmission rate (WVTR). Typically, the MVTR is measured in a special chamber, divided vertically by the substrate/barrier material. A dry atmosphere is in one chamber, and a moist atmosphere is in the other. A 24-hour test is run to see how much moisture passes through the substrate/barrier from the "wet" chamber to the "dry" chamber under conditions which can specify any one of five combinations of temperature and humidity in the "wet" chamber.

The films produced from polymers of this disclosure may be used in the formation of any variety of end-use articles. For example, the polymer may be extruded into a sheet, which is then thermoformed into an end use article such as a container, a cup, a tray, a pallet, a toy, or a component of another product. Other nonlimiting examples of end-use articles which may be produced from the films of this disclosure include merchandise bags, t-shirt bags, trash can liners, grocery sacks, produce bags, food packaging for contents such as cereals, crackers, cheese, meat, etc., shrink wrap and, other items. In an embodiment the polymers disclosed herein (e.g., polyethylene) may be formed into films which can be useful in food packaging.

Example 1

Figure 1:
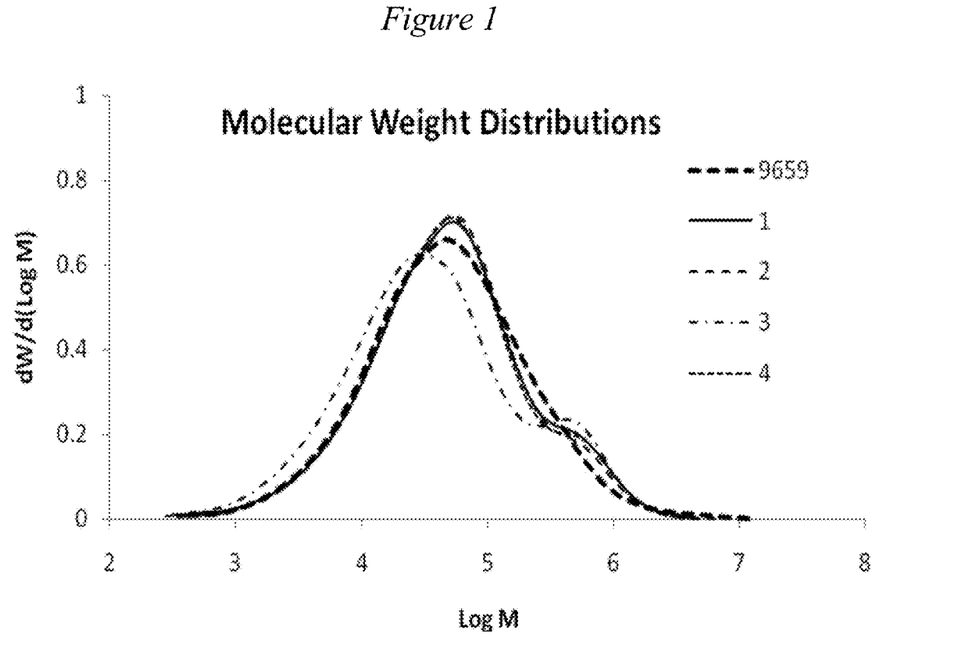
FIG. 1 is a graphical representation of molecular weight distribution profiles for the samples from Example 1.
Figure 2:
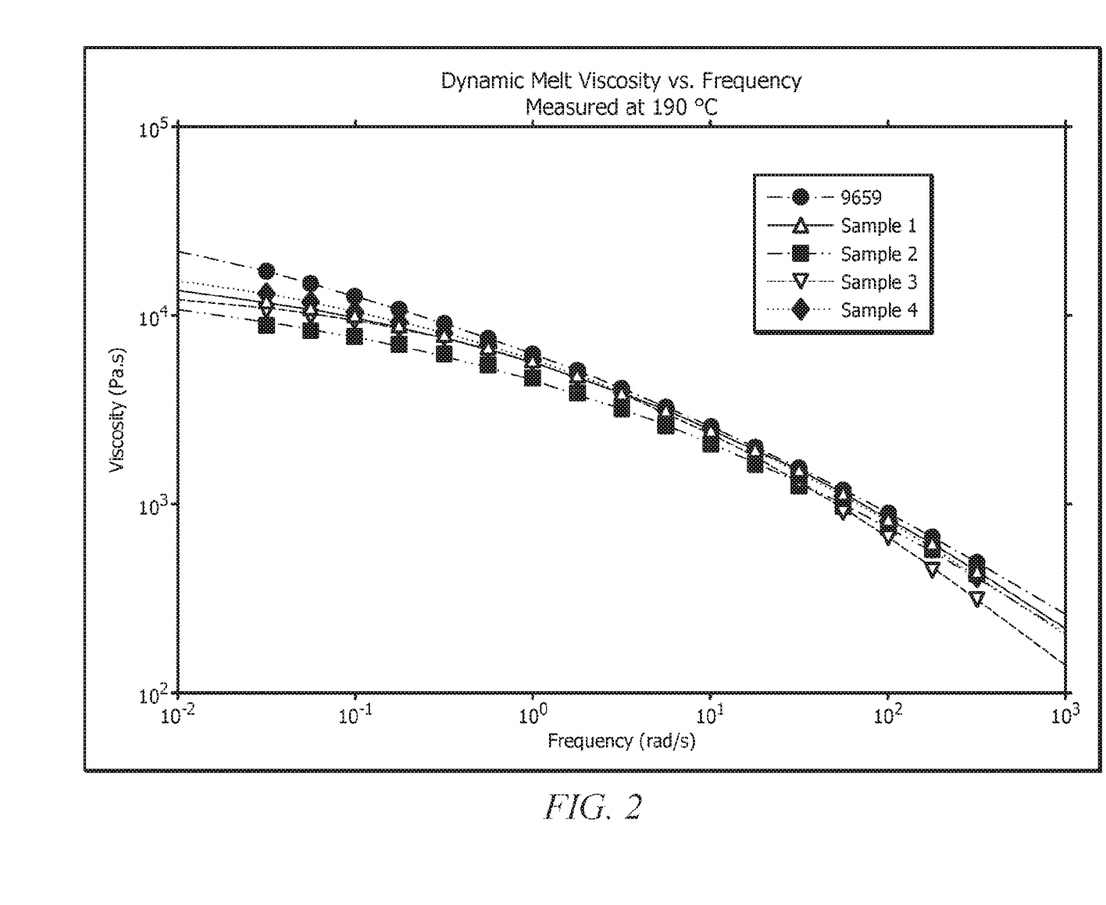
FIG. 2 is a plot of the dynamic melt viscosity as a function of frequency for the samples from Example 1.

Polymers of the type described herein were prepared using a catalyst system comprising at least two metallocene complexes (e.g., MTE-A and MTE-B), a solid oxide (e.g., sulfated alumina) and an organoaluminum compound (e.g., tri-isobutylaluminum (Tiba)). Specifically 4 samples, designated Samples 1-4, of polyethylene homopolymers were prepared as disclosed herein. Various polymer properties were assessed and the results are presented in Table 1. Also shown are the values for a comparative polyethylene resin MARLEX 9659 which is a high density polyethylene commercially available from Chevron Phillips Chemical Company LLC. The molecular weight distribution profiles and a plot of the dynamic melt viscosity as a function of frequency for the samples are presented in FIGS. 1 and 2, respectively. Rheological parameters of zero shear viscosity—$\eta_0$, characteristic viscous relaxation time—$\tau_\eta$ and the breadth parameter—a were determined by melt rheological characterizations which were performed as follows: Small-strain (10%) oscillatory shear measurements were performed on a Rheometrics Scientific, Inc. ARES rheometer using parallel-plate geometry. All rheological tests were performed at 190° C. The complex viscosity $|\eta^*|$ versus frequency ($\omega$) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a. The simplified Carreau-Yasuda (CY) empirical model is as follows, $$|\eta^*(\omega)| = \frac{\eta_0}{[1+(\tau_\eta \omega)^a]^{(1-n)/a}},$$

wherein:
$|\eta^*(\omega)|$=magnitude of complex shear viscosity;
$\eta_0$=zero shear viscosity;
$\tau_\eta$=viscous relaxation time (Tau($\eta$));
a="breadth" parameter (CY-a parameter);
n=fixes the final power law slope, fixed at 2/11; and
$\omega$=angular frequency of oscillatory shearing deformation.
Moisture vapor transmission rates were determined in accordance with ASTM F-1249 using a relative humidity of 100% at 100° F.

While embodiments of the invention have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference, to the extent that they provide exemplary, procedural or other details supplementary to those set forth herein.

What is claimed is:

1. A dual-metallocene catalyzed bimodal polyethylene polymer having a higher molecular weight (HMW) component and a lower molecular weight (LMW) component wherein the LMW component is present in an amount of from about 60% to about 90% based on the total weight of the polymer and the HMW component is present in an amount of from about 10% to about 40% based on the total weight of the polymer; a melt index of from about 0.5 g/10 min to about 4.0 g/10 min; a density of equal to or greater than 0.96 g/cc; having a ratio of z-average molecular weight to weight average molecular weight of from about 3 to about 7; which when formed into a 1-mil blown film displays a moisture vapor transmission rate as determined in accordance with ASTM F 1249 at 1 mil, 100% humidity, and 100° F. ranging from equal to or greater than about 0 to equal to or about 20% greater than X where X=$k_1$ {−61.95377+39.52785($M_z/M_w$)−8.16974($M_z/M_w$)$^2$+0.55114($M_z/M_w$)$^3$}+$k_2${−114.01555($\tau$)+37.68575 ($M_z/M_w$)($\tau$)−2.89177($M_z/M_w$)$^2$($\tau$)}+$k_3${120.37572($\tau$)$^2$− 25.91177($M_z/M_w$)$^2$}+$k_4${18.03254($\tau$)$^3$}; $M_w$ is from about 100 kg/mol to about 180 kg/moL; $M_z$ is from about 300 kg/mol to about 1000 kg/mol; $\tau$ is from about 0.01 s to about 0.35 s; $k_1$ is 1 g/100 in$^2$·day: $k_2$ is 1 g/100 in$^2$·day·s; $k_3$ is 1 g/100 in$^2$·day·s$^2$; $k_4$ is 1 g/100 in$^2$·day·s$^3$; and $\tau$ is determined by small-strain oscillatory shear measurements at 190° C.

2. The polymer of claim 1 having a polydispersity index of from about 6 to about 20.

3. The polymer of claim 1 having a rheological relaxation time of from about 0.05 s to about 0.35 s.

4. The polymer of claim 1 wherein the polymer comprises a homopolymer of ethylene.

5. The polymer of claim 1 having a weight average molecular weight of from about 110 kg/mol to about 170 kg/mol.

6. The polymer of claim 1 having a z-average molecular weight of from about 500 to about 1000 kg/mol.

7. The polymer of claim 1 having a zero shear viscosity of from about 8000 Pa-s to about 50000 Pa-s.

8. The polymer of claim 1 having a CY-a value of greater than about 0.2.

9. The polymer of claim 1 which when formed into a 1-mil thick blown film displays a moisture vapor transmission rate of equal to or less than about 0.55 g-mil/100 in$^2$ in 24 hours as determined in accordance with ASTM F 1249.

10. The polymer of claim 1 which formed into a 1-mil thick blown film displays a moisture vapor transmission rate of equal to or less than about 0.50 g-mil/100 in$^2$ in 24 hours as determined in accordance with ASTM F 1249.

11. The polymer of claim 1 prepared in a single reactor where the reactor employs a loop slurry process.

12. A food packaging container comprising a film formed from the polymer of claim 1.

13. The polymer of claim 1 having a zero shear viscosity of from about 10000 Pa-s to about 45000 Pa-s.

14. The polymer of claim 1 having a density of greater than about 0.9615 g/cc.

15. The polymer of claim 1 having a polydispersity index of from about 7.5 to about 16.

\* \* \* \* \*